United States Patent [19]

Akutagawa

[11] 4,421,773

[45] Dec. 20, 1983

[54] PROCESS FOR MOLDING CHOCOLATE TO MAKE CHOCOLATE BLOCK HAVING ORNAMENTAL PATTERN AND INTERNAL HOLLOW CAVITY

[75] Inventor: Tokuji Akutagawa, Tokyo, Japan

[73] Assignee: Akutagawa Chocolate Co., Ltd., Tokyo, Japan

[21] Appl. No.: 474,077

[22] Filed: Mar. 10, 1983

Related U.S. Application Data

[63] Continuation-in-part of Ser. No. 260,250, May 5, 1981, Pat. No. 4,382,968.

[51] Int. Cl.³ .......................... A23G 1/00; A23G 1/21
[52] U.S. Cl. ...................................... 426/249; 426/613; 426/631; 426/660; 426/512; 426/515; 99/426
[58] Field of Search ............... 426/103, 104, 249, 512, 426/515, 613, 660, 631; 99/426

[56] References Cited

U.S. PATENT DOCUMENTS

| | | | |
|---|---|---|---|
| 1,777,896 | 10/1930 | Rossi | 426/104 |
| 1,865,097 | 6/1932 | Gilham | 426/249 |
| 3,091,194 | 5/1963 | Dickinson | 426/249 |
| 3,545,981 | 12/1970 | Klein et al. | 426/515 |
| 3,556,022 | 1/1971 | Westin | 426/515 |
| 3,770,460 | 11/1973 | Vroman | 426/249 |
| 4,001,439 | 1/1977 | Zonni et al. | 426/249 |
| 4,105,801 | 8/1978 | Dogliotti | 426/613 |
| 4,382,968 | 5/1983 | Akutagawa | 426/249 |

*Primary Examiner*—Jeanette M. Hunter
*Attorney, Agent, or Firm*—Jordan & Hamburg

[57] ABSTRACT

According to the invention, there is provided a process for molding chocolate to make a molded product including a thin ornamental relief pattern made of a first chocolate material of one color and a body portion carrying the thin ornamental relief pattern and made of a second chocolate material of different color. The body portion has a hollow cavity internally thereof. The first and second chocolate materials contain 30 to 40% by weight of the same kind of base oils and fats. The process comprises the steps of casting the first chocolate material into a first mold to form the thin ornamental relief pattern, pouring into a second mold the second chocolate material to form the body portion, combining the first and second molds to form a closed mold and rotating the closed mold while vibrating to thereby form a hollow cavity in the body portion.

13 Claims, No Drawings

PROCESS FOR MOLDING CHOCOLATE TO MAKE CHOCOLATE BLOCK HAVING ORNAMENTAL PATTERN AND INTERNAL HOLLOW CAVITY

CROSS-REFERENCE TO RELATED APPLICATION

This application is a continuation-in-part of application Ser. No. 260,250 filed May 5, 1981 now U.S. Pat. No. 4,382,968.

BACKGROUND OF THE INVENTION

1. Field of the Invention

The present invention relates to a process for molding chocolate, and particularly to a process for making a molded chocolate block having a main body of one color and an ornamental relief pattern of another color different from that of the main body, the main body having an empty or hollow cavity internally thereof and carrying said ornamental relief pattern on at least one surface thereof.

2. Prior Art

I have previously proposed a process for molding chocolate to make a chocolate block having an ornamental relief pattern including slender lines and/or concave and convex portions. According to the process previously proposed by me, at least 60%, by weight, of the base oils and fats contained in the chocolate material forming the main body are the same as those contained in the chocolate material forming the ornamental pattern. In this preceding process, made known in the art by Japanese Patent Disclosure No. 174057/1982, a first chocolate material is cast into an engraved pattern of a first mold followed by scraping off the excess material, and the surface of the first chocolate material in the engraved pattern is rapidly cooled to a predetermined temperature. Then, the first mold is combined with a second mold into which a second chocolate material is cast while being fluidized by heating to cover the ornamental pattern formed by the first chocolate material followed by cooling, so that the first chocolate material forming the ornamental relief pattern is allowed to adhere firmly onto the surface of the main body of the molded chocolate block. However, it is hardly practicable to mold a chocolate block having an internal empty or hollow cavity and provided with an ornamental relief pattern on the surface thereof simply by applying this known process.

OBJECTS AND SUMMARY OF THE INVENTION

An object of this invention is to provide a simple and efficient process for forming an ornamental relief pattern which is firmly adhered to a body or substrate of chocolate having an internal empty or hollow cavity.

Another object of this invention is to provide a process for molding chocolate to make a product having a delicate and clear relief pattern which is firmly adhered to a body of chocolate having an internal empty or hollow cavity.

A further object of this invention is to provide a process for molding chocolate to make a product having an internal empty or hollow cavity and having a surface provided with an ornamental relief pattern which is firmly adjoined or fused to a body of chocolate rather than embedded in the chocolate body.

A still further object of this invention is to provide a process for molding chocolate to make a product having a body made of chocolate of one color and having an internal empty or hollow cavity and a surface carrying an ornamental relief pattern made of chocolate of different color and firmly adhered to the body.

Yet a further object of this invention is to provide a process for molding chocolate to make a product having a body shell having an internal empty or hollow cavity and carrying a thin ornamental relief pattern including fine but clear lines.

Another object of this invention is to provide a process for molding chocolate to make a product having a body shell of one color having an internal empty or hollow cavity and carrying an extremely thin pattern of different color, the pattern being so thin as to become translucent and to allow the color of the body shell visible as a compounded color.

A further object of this invention is to provide a process for molding chocolate to make a product having a body shell having an internal empty or hollow cavity and having an outer contour including side wall segments extending in an angled relationship with each other.

A further object of this invention is to provide a process for molding chocolate to make a product having a complicated outer countour.

The above and other objects of this invention will become clear from the following detailed description of the invention.

This invention provides a process for molding chocolate to make a molded product including a thin ornamental relief pattern made of a first chocolate material of one color and a body portion carrying said thin ornamental relief pattern and made of a second chocolate material of different color, said body portion having a hollow cavity internally thereof, said first and second chocolate materials containing 30 to 40%, by weight, of the same kind of base oils and fats, and the difference between the content of base oils and fats is said first chocolate material and the content of base oils and fats in said second chocolate material being 10%, by weight, or less, said process comprising the steps of: fluidizing said first chocolate material by heating; casting said fluidized first chocolate material into an engraved pattern formed on the face of a first mold; scraping said face of said first mold to press said first chocolate material into said engraved pattern and to scrape off the excess material; rapidly cooling the surface of said first chocolate material to a temperature of from 18° C. to 22° C. thereby to crystallize the base oils and fats contained in said first chocolate material to form microcrystallities; fluidizing said second chocolate material by heating; pouring into a second mold said fluidized second chocolate material in an amount of at least 30% by volume of the total apparent volume of the molded product including the volume of the hollow cavity; placing the first mold on at least said second mold so that at least said second mold is closed by said first mold; rotating and vibrating said closed mold formed by said first mold and at least said second mold at such a speed as not to allow said first chocolate material to be effected by centrifugal force while said micro-crystallites are growing in said first chocolate material so that said fluidized second chocolate material is allowed to adhere substantially uniformly onto the inner faces of said closed mold, thereby forming an empty or hollow center cavity; cooling the whole body to be solidified by crystallization of the base oils and fats contained in said second chocolate material in all the regions including the interface region at which said second chocolate material penetrates into and adjoins to said first chocolate material; and opening said closed mold to remove the solidified product therefrom.

DESCRIPTION OF THE INVENTION

The chocolate material used for forming the ornamental relief pattern in this invention is preferably a chocolate material of white color, referred to as "white chocolate". If the "white chocolate" is used to form the relief pattern, it is preferred to use brown chocolate for the body or substrate portion of the molded chocolate product. However, the ornamental relief pattern may be made of brown chocolate to be carried on the body portion of white chocolate. Principally, a combination of colors is not limited and may be selected in view of the aesthetic appreciation and the commercial value.

Irrespective of what combination of colors is selected, the chocolate materials both for the ornamental relief pattern and for the body portion should contain 30 to 40 wt.%, preferably 34 to 38 wt.%, and more preferably 36 to 38 wt.%, of base oils and fats. If the total content of base oils and fats is less than 30 wt%, the consistency of chocolate becomes poor to lower the initial adhesive property at the interface between the pattern and the body portions. Since the base oils and fats contained in two chocolate materials, one for the relief pattern and the other for the base portion, crystallize at the interface region of the pattern and the body, as will be described in detail hereinafter, the adhesive power at the interface region is lowered to an unsatisfactory level if the total content of base oils and fats of either one of the two chocolate materials is less than 30 wt.%. In addition, if the content of base oils and fats contained in the chocolate material for the ornamental relief pattern is less than 30 wt.%, the material cannot be filled into slender or very small cavities engraved to form a fine pattern to impair the fineness or sharpness of the molded relief pattern.

On the contrary, if the content of base oils and fats exceeds 40 wt.%, solidified chocolate becomes nearly transparent rather than translucent to impair the clearness of the relief pattern. A further important characteristics of this invention are that the base oils and fats contained in both of said two chocolate materials should be of the same kind and that the difference in content of base oils and fats between said two chocolate materials should not be more than 10%, by weight. If the base oils and fats contained in one of the two chocolate materials are different from those contained in the other chocolate material, adhesion at the interface between the two chocolate materials becomes poor due to difference in composition of ingredient fatty acid glycerides and there is a possibility that the chocolate material forming the ornamental relief pattern tends to peel off from the chocolate material forming the shell body, due to excessive difference in shrinkage coefficient, during the step of rotating and vibrating the closed mold containing the fluidized chocolate material for forming the shell body and the subsequent step of cooling to solidify the chocolate material for the shell body while continuing to rotate and vibrate the closed mold. Further, even though the base oils and fats contained in both of the two chocolate materials are the same, if the content of base oils and fats of one chocolate material is differentiated from that of the other chocolate material by more than 10%, by weight, there is a possibility that the two chocolate materials are separated from each other at the interface thereof due to difference in densities of the ingredient fatty acid glycerides. In order to obviate these disadvantageous phenomena, the base oils and fats contained in both of the two chocolate materials should be the same, and if the content of base oils and fats in one chocolate material is, for example, 30 wt.%, that in the other chocolate material should not exceed 40 wt.%.

The base oils and fats which may be used in this invention are preferably those contained in cacao butter. A substitute material for cacao butter or a mixture of such a substitute material with cacao butter may be used. The substitute material for cacao butter, as used herein and in the appended claims, means the material like the cacao butter and having a composition mainly composed of glycerides of oleic acid, stearic acid and palmitic acid but containing only little glycerides of unsaturated fatty acids having two or more double bonds. Such a substitute material may be synthesized by extracting said glycerides of said three fatty acids from a vegetable oil or fat, such as cotton seed oil, rice bran oil, illippe butter or coconut oil, or an animal fat, such as beef tallow, and processing the separated extract to increase the content of dioleopalmitostearin, which is a characteristic ingredient of cacao butter.

The chocolate materials for the relief pattern and for the body portion are separately prepared. An exemplified composition of the "white chocolate" contains 30 to 40 wt.% of cacao butter, 55 to 65 wt.% of sugar and 5 to 10 wt.% of powdered milk. On the other hand, the most commonly used composition for brown chocolate contains 15 to 25 wt.% of cacao mass, 15 to 25 wt.% of cacao butter, 35 to 45 wt.% of sugar and 15 to 25 wt.% of powdered milk. In preparation of brown chocolate composition, the quantity of cacao butter added in the form of pure cacao butter is adjusted in consideration of the quantity of cacao butter contained in cacao mass so that the total content thereof contained in the final composition ranges within 30 to 40 wt.%. A natural or synthetic flavouring agent, such as vanilla, and an emulsifier, such as lecithin, lysolecithin or cephalin may be added. An ester of sugar and a fatty acid may be added to facilitate unifrom growth of fine and stable crystallites of cacao butter.

The chocolate composition is mixed and kneaded, and then passed through a roll refiner to obtain a paste of fine texture. The composition is then processed through the known conching and tempering steps. According to this invention, the fluidized chocolate material for the relief pattern is then cast in a first mold having a bottom plate engraved with an ornamental design. The engraved grooves forming the designed pattern is shallow. Then, the surface of the bottom plate of the mold is scraped to press the chocolate material into the grooves and concurrently to scrape off the excess material. As has been described before, the chocolate material for the relief pattern can be firmly adhered to the body portion of chocolate according to this invention and a thin and delicate relief pattern including fine concave and convex lines can be formed. The thickness of the relief pattern can be so thinner as to the order of 100 microns to 3 mm, particularly 200 microns to 1 mm.

The process of this invention includes the step of rapidly cooling the surface of the cast chocolate material for the relief pattern to a temperature of from 18° to 22° C., preferably 19° to 21° C., immediately after casting and scraping the same. Formation and growth of micro-crystallites of the base oils and fats can be promoted by rapidly cooling the chocolate material. The coherent property of the chocolate material is improved by the presence of micro-crystallites of base oils and fats to increase the adhesive or fixing power developed at the interface region of the relief pattern and the chocolate material for the body portion. Furthermore, when finer crystallites are formed at the interface region, the base oils and fats contained in the material for the body chocolate portion penetrate into the solidified relief pattern material at the interface region more easily to increase the bonding force developed after the body chocolate portion is solidified. If the surface temperature of the relief pattern is cooled too far below 18° C., the pasty property is lost, resulting in reduction of coherent property. On the contrary, if the surface temperature after rapid cooling is higher than 22° C., the degree of crystallinity of the relief pattern chocolate material is yet insufficient to provide the interface region with satisfactory coherence and there is a risk of crumbling of the relief pattern due to insufficient solidification. For the reasons as set forth hereinabove, it is essential that the surface temperature of the relief pattern after rapid cooling should be controlled within the range of 18° C. to 22° C. In case where the chocolate material for the relief pattern is fluidized to have a temperature of from 29° C. to 31° C., the surface temperature thereof after rapid cooling can be lowered to a temperature within the range of 18° C. to 22° C. by placing the cast chocolate in an atmosphere of about 5° C. for about 2 to 3 minutes. Although the time period required for lowering the surface temperature within the range defined above varies depending on the thickness of the relief pattern and the heat capacity and thermal conductivity of the mold, it is important to cool the surface temperature of the relief pattern material rapidly to 18° C. to 22° C., preferably 19° C. to 21° C., thereby to allow the body chocolate material to adhere firmly to the thus cooled and semisolidified surface of the relief pattern material and to facilitate molding and solidification of the body chocolate material.

Then, a fluidized chocolate material for the shell body is poured into a separate second mold in an amount of at least 30 vol%, preferably 30 to 70 vol%, more preferably 40 to 60 vol%, of the total apparent volume of the molded product including the volume of the hollow cavity. If the amount of the fluidized chocolate material in the second mold is less than 30 vol%, the wall thickness of the resultant shell body becomes too thin, particularly when the shell body has corner portions.

The next step is the step of inverting the first mold carrying the relief pattern material in which fine crystallites are continuously growing, and fixedly placing the first mold on the second mold so that a closed molding cavity is formed by thus combined the first and second molds. One or more of third molds may be interposed between the first and second molds. A third mold having a tapered side wall which is inclined in an angled relationship with the side wall of the second mold may be combined with the first and second molds to produce a molded shell body having a complicated outer contour with the side wall segments bent in an angled relationship with each other. A plurality of third molds may be used, and an engraved pattern may be formed on the inner face of any third mold to carry a further ornamental relief forming material therein similar to the first mold.

The closed mold formed by the first and second molds optionally with one or more third mold is rotated and vibrated while micro-crystallites of base oils and fats are growing in the chocolate material forming the ornamental relief pattern, so that overall inner face of the closed mold is covered by the adhering chocolate material for the shell body and the center portion of the molding cavity is left empty. The frequency of vibration may be 400 to 600 times a second, preferably 450 to 550 times a second, and the amplitude of vibration may be 0.5 to 3 mm, preferably 1 to 2 mm. If the frequency of vibration is less than 400 times a second and the amplitude of vibration is less than 0.5 mm when the content of base oils and fats in the chocolate material for the shell body is 30 wt%, there are some cases where uniform dispersion or distribution of the chocolate material cannot be attained due to insufficient fluidity. On the contrary, if the frequency of vibration exceeds 600 times a second or the amplitude of vibration exceeds 3 mm when the content of base oils and fats in the chocolate material is 40 wt%, there is a possibility that the wall of the shell body tends to collapse. A shell body having uniform wall thickness cannot always be molded if the amplitude of vibration is less than 0.5 mm.

The rotational speed should be controlled so that the chocolate material forming the shell body is not maldistributed by the influence of excessive centrifugal force. The closed mold containing the fluidized chocolate material for the shell body should be rotated three-dimensionally, for example, by carrying the mold at an end of a rotating shaft extending substantially perpendicular from a rotating drum.

Subsequent to the step of rotating and vibrating the closed mold, the chocolate material for the shell body is cooled under rotation and vibration while the micro-crystallites are growing in the chocolate material for the ornamental relief pattern. Prior to the cooling step, air contained in the chocolate material may be removed by the degassing step. Degassing may be effected by the vibration method or other methods. Throughout the cooling step, base oils and fats contained in the shell body chocolate material penetrate into the interface region of the semi-solidified relief pattern chocolate material, where they are crystallized while being intermingled or entangled with the micro-crystallites formed from the relief pattern material so that firm bond is developed in the interface region. Cooling in the closed mold may be continued until the whole chocolate body is solidified, or the chocolate body may be further cooled after it is discharged from the closed mold. The time period required for cooling varies depending on the cooling temperature and the thickness of the shell body of the chocolate product. If a chocolate material for the shell body is fluidized to have a temperature of 29° C. to 31° C. and cooled in an atmosphere of 4° C. to 7° C., the chocolate material is generally solidified for about 15 to 25 minutes.

According to a further aspect of this invention, a chocolate block molded separately may be bonded through an adhesive chocolate paste, with the chocolate block produced by the aforementioned process and including a thin ornamental relief pattern of one color and a shell body of different color carrying the thin ornamental relief pattern and having an empty or hollow cavity, whereby a chocolate product having more complicated shape and ornamental relief patterns may be produced. The adhesive chocolate paste used for this purpose should contain 30 to 45 wt%, preferably 35 to 43 wt%, of base oils and fats, and at least 60 wt% of the base oils and fats contained in the adhesive chocolate paste should be of the same kind as those contained in both of the material for the shell body carrying the ornamental relief pattern and the material for the chocolate block separately molded. If the content of base oils and fats in the adhesive chocolate paste is less than 30 wt%, the paste becomes deficient in tackifying property to result in poor adhesiveness at the initial stage. On the contrary, if the content of base oils and fats in the adhesive chocolate paste exceeds 45 wt%, the paste is fluidized excessively to have insufficient viscosity to be used as an adhesive. A chocolate paste having a viscosity ranging within 120 to 200 poises may be conveniently used for this purpose. The chocolate block separately molded and combined with the chocolate block produced by the process of this invention may be a variety of chocolate blocks which have been molded through any of the known processes. Two or more of chocolate blocks molded in accordance with the process of this invention and each having a shell body carrying an ornamental relief pattern and having an internal empty or hollow cavity may be bonded together.

EXAMPLES OF THE INVENTION

This invention will now be described more specifically by referring to some examples thereof. However, it should be noted that the following examples are only illustrative and this invention is not limited thereby. In the examples, "part" stands for "part by weight" unless otherwise specified.

Example 1

White chocolate was prepared by mixing 35 parts of cacao butter, 58 parts of sugar, 7 parts of powdered milk and 0.3 parts of lecithin in accordance with the following procedure.

About a half of cacao butter contained in the aforementioned composition was heated to about 60° C. to be liquefied and transferred to a neader, where sugar and powdered milk were added thereto little by little to be mixed and kneaded. After adding 0.15 parts of lecithin, kneading was continued at about 45° C. for 0.5 hour to mix the mixture intimately. The mixture was passed through a roll refiner continuously to pulverize the particles contained therein, and then conveyed to a rotary conche, where the remaining part of cacao butter was added. The content in the conche was conched at about 55° C. for 12 hours during which time the remaining part of lecithin was added and the temperature was lowered finally to 45° C. to complete the conching processing.

After being processed through the conching operation as set forth above, the chocolate material is transferred to a tempering machine to be tempered and the temperature of chocolate discharged from the tempering machine is adjusted to 29° C.

Separately, normal brown chocolate was prepared by mixing 20 parts of cacao mass (Content of cacao butter: 50 to 55 wt.%), 22 parts of cacao butter, 38 parts of sugar, 20 parts of powdered milk and 0.3 parts of lecithin. The preparation procedure was generally similar to that employed for the preparation of white chocolate as mentioned just above, except in that cacao mass and cacao butter were heated and melted separately and then transferred to the keader.

The white chocolate discharged from the tempering machine and maintained to have a temperature of 29° C. was then cast into a polycarbonate mold having a bottom plate engraved with an ornamental relief pattern including fine concave and convex lines. The minimum width of the lines was 200 microns, and the thickest portion of the relief pattern was about 1 mm and thinnest portion of the relief pattern was about 100 microns. After casting, the face of the bottom plate of the mold was scraped. Immediately after scraping, the mold carried on a conveyer belt was passed through a cooling chamber maintained at 5° C. for 2 minutes to cool or quench the surface of the cast white chocolate material rapidly to 21° C.

Then, 55 $cm^3$ of the brown chocolate material discharged from the tempering machine and maintained to have a temperature of 29° C. was poured into a separate second mold having a capacity of 110 $cm^3$. Subsequently, the top opening of the second mold is closed by the first mold carrying the cast white chocolate material with the bottom plate engraved with said ornamental relief pattern facing inward of the closed mold. The closed mold formed by the first and second molds and containing therein the fluidized brown chocolate material was mounted on a spinning machine which was set to vibrate at a frequency of 500 times a second and at an amplitude of 1 mm and to rotate at a rotating speed of the drum of 2.5 rpm. The closed mold and the content thereof was cooled at 5° C. for 2 minutes, and the mold was dismounted from the spinning machine and passed through a cooling tunnel where it was cooled at 5° C. for 15 minutes. Then the mold was opened and the solidified chocolate was removed from the mold to obtain a molded chocolate block including a shell body made of the brown color chocolate material and having an internal empty or hollow cavity and an ornamental relief pattern made of the white chocolate material adhering on the surface of the shell body of brown color chocolate material. The molded block had the dimensions of 3.5 cm×3.5 cm×9 cm.

Relief lines of about 200 microns in width and about 100 microns in thickness were sharply molded to form clear lines. The portions of the pattern formed by the thin layers of white chocolate were seen to have compounded colors because the brown color of the shell body was viewed through the translucent white relief pattern.

After storing in a refrigerator maintained at 20° C. for one day, the chocolate block was put out. A portion of the relief pattern was scratched by a fingernail to try to peel off the same. However, the relief pattern was not peeled off. When a strong pressing power was applied on the relief pattern, the pressed portion thereof was embedded in the shell body. Another chocolate block was maintained at a room temperature of 25° C. for an hour, and a similar trial was made to peel off the relief pattern by finger as described hereinabove, but the relief pattern was not peeled off. When a strong pressing power was applied on the relief pattern, the relief pattern layer was embedded in the shell body a little. A further trial was made to push the walls of the shell body to collapse the same, the shell body could not be collapsed easily.

Example 2

Similar procedure was repeated as in Example 1, except in that another kind of white chocolate was prepared by mixing 40 parts of cacao butter, 55 parts of sugar, 5 parts of powdered milk and 0.3 parts of lecithin. A chocolate block having an ornamental relief pattern made of the thus prepared white chocolate was molded similarly as in Example 1.

Using a finger, a similar trial as in Example 1 was made to peel off the relief pattern of white chocolate to obtain similar results as obtained in Example 1. Also, a similar trial as in Example 1 was made to collapse the shell body, but the shell was not collapsed by a normal pushing force.

Example 3

Using the same white chocolate as used in Example 1 as the material for the relief pattern, similar procedure as in Example 1 was repeated except in that the body of a chocolate product was made of a brown chocolate material prepared by mixing and kneading 30 parts of cacao mass (Content of cacao butter: 50 to 55 wt.%), 23 parts of cacao butter, 45 parts of sugar, 2 parts of powdered milk and 0.3 parts of lecithin, and except in that 37 cm$^3$ of the brown chocolate material for the shell body was poured into the second mold.

A similar peeling test and a similar collapsing test were conducted using a test specimen stored for a day in a refrigerator maintained at 20° C., and similar results were obtained as in Example 1. However, when another test specimen which had been allowed to stand in an atmosphere at 28° C. for an hour was pressed intensely by finger, a portion of the relief pattern was embedded in the shell body and the pressed portion of the shell body was collapsed at some extent.

Example 4

A white chocolate material for the ornamental relief pattern similar to the white chocolate composition used in Example 1 was prepared, except in that 30 parts of cacao butter and 10 parts of a substitute material for cacao butter were used. The used substitute material for cacao butter was available from kanegafuchi Chemical Industry Co., Ltd. under the trade name of "Belco BE 10" which was mainly composed of illippe butter. A brown chocolate material for the shell body was prepared similarly to the brown chocolate composition used in Example 1, except in that 20 parts of cacao mass (containing 50 wt% of cacao butter), 17 parts of cacao butter and 10 parts of the aforementioned "Belco BE 10" were used. The following procedures were similar to Example 1 to produce a chocolate block having an ornamental relief pattern.

The results of peeling and collapsing tests by finger were similar to those obtained in Example 1.

Comparative Example 1

The same white and brown chocolate materials as used in Example 1 were used. After scraping the surface of the bottom plate of the mold, the mold was held in a cooling chamber maintained at 4° C. for 4 minutes and 20 seconds to cool the surface temperature of the scraped face of the white chocolate rapidly to 16° C. Other steps were similar as those described in Example 1.

The result was tremendous in that the relief pattern of white chocolate was separated from the body portion of brown chocolate at the step of removing the solidified product from the mold.

Comparative Example 2

The same white and brown chocolate materials as used in Example 1 were used. After scraping the surface of the bottom plate of the mold, the mold was passed through a colling chamber maintained at 6° C. for 2 minutes. The surface temperature of the scraped face of the white chocolate material was cooled to 23° C. Other steps were similar to those described in Example 1.

The obtained chocolate product was of no commercial value in that concave and convex portions of the relief pattern were collapsed.

Comparative Example 3

A similar procedure was followed as in Example 1, except in that the white chocolate material as used in Example 1 was replaced by a white chocolate material prepared by mixing and kneading 28 parts of cacao butter, 65 parts of sugar, 7 parts of powdered milk and 0.3 parts of lecithin.

The obtained chocolate product was of lesser commercial value in that fine lines of the relief pattern were discontinuous.

Comparative Example 4

A white chocolate material for the ornamental relief pattern was prepared similarly as the white chocolate composition used in Example 1, except in that 35 parts of cacao butter of the latter-mentioned composition was replaced by 17.5 parts of cacao butter and 17.5 parts of the same substitute material for cacao butter, i.e. "Belco BE 10" available from Kanegafuchi Chemical Industry Co., Ltd.. The same brown chocolate material as used in Example 1 was used for molding the body portion. The operation steps were the same as described in Example 1.

The result was that the relief pattern of white chocolate was separated from the body portion of brown chocolate at the step of removing the solidified product from the mold and the white chocolate material was left in the engraved grooves of the bottom plate of the mold.

Comparative Example 5

The same white chocolate material as used in Example 2 was used to form the relief pattern. In accordance with the similar procedure as in Example 1, a brown chocolate material was prepared by using a composition consisting of 33 parts of cacao mass (Content of cacao butter: 50 to 55 wt.%), 25 parts of cacao butter, 40 parts of sugar, 2 parts of powdered milk and 0.3 parts of lecithin.

Although a chocolate block was molded in accordance with the same procedure as in Example 1, the relief pattern made of the white chocolate material set forth above was separated from the body made of the brown chocolate material at the step of removing the solidified block from the mold and the white chocolate material was left in the engraved cavities of the bottom plate of the mold.

Comparative Example 6

A procedure similar to Example 1 was repeated except in that the white chocolate material as used in Example 4 was used as the material for the ornamental relief pattern. However, the ornamental relief pattern was separated from the shell body when the molded chocolate block was removed from the molds.

Comparative Example 7

A procedure similar to Example 1 was repeated except in that 27.5 cm³ of the chocolate material for the shell body was poured in the second mold to produce a chocolate block having an ornamental relief pattern. However, a portion of the wall of the resultant shell body was too thin, so that the portion was broken to form a hole when pushed lightly by finger.

Example 5

In accordance with the similar procedures as in Example 1 except that the frequency and the amplitude of vibration by the spinning machine were changed as shown in the following Table. Ten chocolate blocks were molded under each operational condition.

| Test No. | Frequency of Vibration (times/sec) | Amplitude of Vibration (mm) | Rotational Speed of Drum (rpm) |
|---|---|---|---|
| 1 | 380 | 1.5 | 2.5 |
| 2 | 500 | 1.5 | 4.5 |
| 3 | 600 | 4 | 2.5 |
| 4 | 600 | 4 | 1.5 |
| 5 | 380 | 0.5 | 2.5 |

Ten chocolate block specimens prepared under each operational condition were cut to examine the uniformity of the shell wall to reveal that the shell wall was not uniform with the empty or hollow cavity being dislocated from the substantial center of the molded chocolate block under every operational condition. Four of ten specimens prepared under the operational conditions shown by Test Nos. 2 and 5, had thin wall portions which were broken to form holes by pressing by finger. Other chocolate block specimens were not so weak to be broken by finger.

Example 6

White chocolate was prepared by mixing 33 parts of cacao butter, 60 parts of sugar, 7 parts of powdered milk and 0.3 parts of lecithin in accordance with the following procedure.

About a half of cacao butter contained in the aforementioned composition was heated to about 60° C. to be liquefied and transferred to a neader, where sugar and powdered milk were added thereto little by little to be mixed and kneaded. After adding 0.15 parts of lecithin, kneading was continued at about 45° C. for 0.5 hour to mix the mixture intimately. The mixture was passed through a roll refiner continuously to pulverize the particles contained therein, and then conveyed to a rotary conche, where the remaining part of cacao butter was added. The content in the conche was conched at about 55° C. for 12 hours during which time the remaining part of lecithin was added and the temperature was lowered finally to 45° C. to complete the conching processing.

After being processed through the conching operation as set forth above, the chocolate material is transferred to a tempering machine to be tempered and the temperature of chocolate discharged from the tempering machine is adjusted to 29° C.

Separately, normal brown chocolate was prepared by mixing 20 parts of cacao mass (Content of cacao butter: 50 to 55 wt.%), 20 parts of cacao butter, 40 parts of sugar, 20 parts of powdered milk and 0.3 parts of lecithin. The preparation procedure was generally similar to that employed for the preparation of white chocolate as mentioned just above, except in that cacao mass and cacao butter were heated and melted separately and then transferred to the kneader.

The white chocolate discharged from the tempering machine and maintained to have a temperature of 29° C. was then cast into a polycarbonate mold having a bottom plate engraved with an ornamental relief pattern including fine concave and convex lines. The minimum width of the lines was 200 microns, and the thickest portion of the relief pattern was about 1 mm and thinnest portion of the relief pattern about 100 microns. After casting, the face of the bottom plate of the mold was scraped. Immediately after scraping, the mold carried on a conveyer belt was passed through a colling chamber maintained at 5° C. for 2 minutes to cool or quench the surface of the cast white chocolate material rapidly to 21° C.

Then, the brown chocolate discharged from the tempering machine and maintained to have a temperature of 29° C. was cast over the semi-solidifed white chocolate to form a body portion of 5 mm in thickness. After cooling in a cooling chamber maintained at 5° C. for 18 minutes, a solidified chocolate block was removed from the mold to obtain a solid chocolate product having a brown body portion and a relief pattern of white chocolate adhered to the surface of the brown body portion.

Separately, an adhesive chocolate paste (Viscosity: 130 poises) was prepared from 20 parts of cacao mass, 30 parts of cacao butter, 30 parts of sugar, 20 parts of powdered milk and 0.3 parts of lecithin, and applied on a surface of the solid chocolate product prepared by the foregoing procedure.

A separate chocolate block prepared in accordance with Example 1 including a shell body having a hollow cavity and carrying another ornamental relief pattern was placed on the coating of the adhesive chocolate paste to adjoin the solid chocolate product with the chocolate block having an internal hollow cavity. The adjoined bodies were stored in a refrigerator maintained at 20° C. After storing for one day, it was tried to separate the solid chocolate product from the chocolate block having the internal hollow cavity, but they were firmly adhered with each other and could not be separated.

A similar chocolate paste having a viscosity of 220 poises was used in lieu of the aforementioned adhesive chocolate paste. However, the solid chocolate product could not be bonded or adjoined to the chocolate block having an internal hollow portion in accordance with the process of this invention, due to the lack of tackifying property. Another similar chocolate paste having a viscosity of 100 poises was used in lieu of the aforementioned adhesive chocolate paste, but the solid chocolate product was readily separated from the chocolate block having an internal hollow cavity due to insufficient viscous property.

In the foregoing description, the present invention has been specifically disclosed by referring to some examples thereof. However, it should be appreciated that various modifications and variations can be easily made by those skilled in the art without departing from the spirit of the invention. It is, thus, intended to include all such modifications and variations within the wide scope of the present invention defined by the appended claims.

What is claimed is:

1. A process for molding chocolate to make a molded product including a thin ornamental relief pattern made of a first chocolate material of one color and a body portion carrying said thin ornamental relief pattern and made of a second chocolate material of different color, said body portion having a hollow cavity internally thereof, said first and second chocolate materials containing 30 to 40%, by weight, of the same kind of base oils and fats, and the difference between the content of base oils and fats in said first chocolate material and the content of base oils and fats in said second chocolate material being 10%, by weight, or less, said process comprising the steps of:

- (a) fluidizing said first chocolate material by heating;
- (b) casting said fluidized first chocolate material into an engraved pattern formed on the face of a first mold;
- (c) scraping said face of said first mold to press said first chocolate material into said engraved pattern and to scrape off the excess material;
- (d) rapidly cooling the surface of said first chocolate material to a temperature of from 18° C. to 22° C. thereby to crystallize the base oils and fats contained in said first chocolate material to form microcrystallites;
- (e) fluidizing said second chocolate material by heating;
- (f) pouring into a second mold said fluidized second chocolate material in an amount of at least 30% by volume of the total apparent volume of the molded product including the volume of the hollow cavity;
- (g) placing the first mold on at least said second mold so that at least said second mold is closed by said first mold;
- (h) rotating and vibrating said closed mold formed by said first mold and at least said second mold at such a speed as not to allow said first chocolate material to be effected by centrifugal force while said micro-crystallites are growing in said first chocolate material so that said fluidized second chocolate material is allowed to adhere substantially uniformely onto the inner faces of said closed mold, thereby forming an empty or hollow center cavity;
- (i) cooling the whole body to be solidified by crystallization of the base oils and fats contained in said second chocolate material in all the regions including the interface region at which said second chocolate material penetrates into and adjoins to said first chocolate material; and
- (j) opening said closed mold to remove the solified product therefrom.

2. A process as claimed in claim 1, wherein one or a plurality of third molds is interposed between said first and second molds to form said closed mold.

3. A process as claimed in claim 2, wherein said third mold has a tapered side wall inclined in an angled relationship with the side walls of said first and second molds.

4. A process as claimed in claim 1, wherein said ornamental relief pattern is made of white chocolate and said body portion is made of brown chocolate.

5. A process as claimed in claim 1, wherein the thickness of said ornamental relief pattern ranges within 100 microns to 3 mm and said pattern includes a line of 200 microns in minimum width.

6. A process as claimed in claim 1, wherein said base oils and fats are selected from the group consisting of cacao butter, a substitute material for cacao butter and a mixture thereof.

7. A process as claimed in claim 6, wherein said substitute material for cacao butter is a derivative derived from cotton seed oil, rice bran oil, illippe butter, coconut oil and beef tallow, and a mixture thereof.

8. A process as claimed in claim 4, wherein said white chocolate contains 30 to 40 wt.% of cacao butter, 55 to 65 wt.% of sugar and 5 to 10 wt.% of powdered milk.

9. A process as claimed in claim 4, wherein said brown chocolate contains 15 to 25 wt.% of cacao mass, 15 to 25 wt.% of cacao butter, 35 to 45 wt.% of sugar and 15 to 25 wt.% of powdered milk.

10. A process as claimed in claim 9, wherein the added quantity of said cacao butter is adjusted so that the content of cacao butter contained in said brown chocolate amounts to 30 to 40 wt.%.

11. A process as claimed in claim 1, wherein said first chocolate material is heated to have a temperature of from 29° C. to 31° C. thereby to be fluidized at the step (a), and wherein the rapid cooling at the step (d) is effected by placing the mold in an atmosphere of about 5° C. for about 2 to 3 minutes to thereby cool the surface of said first chocolate material to the defined temperature range of from 18° C. to 22° C.

12. A process as claimed in claim 1, wherein said second chocolate material is heated to have a temperature of from 29° C. to 31° C. thereby to be fluidized at the step (e), and wherein the cooling at the step (i) is effected by placing the closed mold formed by the first and second molds in an atmosphere of 4° C. to 7° C. for 15 to 25 minutes.

13. A process as claimed in claim 1, further comprising a step of adjoining the resultant chocolate product with a separately molded chocolate block by the use of an adhesive chocolate paste, said adhesive chocolate paste containing 30 to 45% by weight of base oil and fats, at least 60% by weight of said base oils and fats contained in said adhesive chocolate pase being the same as those contained in both of the said resultant chocolate product and said separately molded chocolate block, and said adhesive chocolate paste having a viscosity ranging within 120 to 200 poises.

* * * * *